(12) United States Patent
Hagerman et al.

(10) Patent No.: US 11,662,015 B2
(45) Date of Patent: May 30, 2023

(54) ARRANGEMENT FOR LUBRICATING A GEAR

(71) Applicant: VOLVO TRUCK CORPORATION, Gothenburg (SE)

(72) Inventors: Henrik Hagerman, Gothenburg (SE); Anders Hedman, Marstrand (SE); Anna Wikström, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/859,165

(22) Filed: Jul. 7, 2022

(65) Prior Publication Data

US 2023/0023243 A1 Jan. 26, 2023

(30) Foreign Application Priority Data

Jul. 15, 2021 (EP) .................................. 21185795

(51) Int. Cl.
*F16H 57/04* (2010.01)

(52) U.S. Cl.
CPC ..... *F16H 57/0484* (2013.01); *F16H 57/0431* (2013.01)

(58) Field of Classification Search
CPC .......................... F16H 57/0484; F16H 57/0431
See application file for complete search history.

(56) References Cited

U.S. PATENT DOCUMENTS

| 5,242,033 A * | 9/1993 | Toraason | F16H 57/0456 |
| | | | 184/6.12 |
| 2021/0095743 A1* | 4/2021 | Brushkivskyy | F16H 3/66 |

FOREIGN PATENT DOCUMENTS

| CN | 101749377 A * | 6/2010 | ........... F16H 57/043 |
| DE | 102010060147 B4 | 3/2017 | |
| DE | 102016102096 A1 * | 8/2017 | |
| EP | 1633998 A1 | 3/2006 | |
| FR | 3084427 A1 | 1/2020 | |
| WO | WO-2004106778 A1 * | 12/2004 | ......... F16H 57/0482 |

OTHER PUBLICATIONS

Extended European Search Report for European U.S. Appl. No. 21185795.8, dated Nov. 3, 2021, 9 pages.

* cited by examiner

*Primary Examiner* — Justin Holmes
(74) *Attorney, Agent, or Firm* — Sage Patent Group

(57) ABSTRACT

An arrangement for lubricating a gear in a toothed gearing comprising a shaft on which the gear is arranged is provided. An engaging ring with a central portion is arranged around said shaft and comprises a surface facing and spaced from an end surface of the gear creating a gap for guiding lubricant to the gear, and at least one first duct for lubricant, whereby said duct has at least one opening into the gap. The component comprises an annular portion with an inner peripheral surface mounted onto an outer peripheral surface of a shoulder on the gear; where axial discontinuities are provided between the shoulder and the annular portion of the component for guiding and distributing lubricant to the roots of the gear.

12 Claims, 12 Drawing Sheets

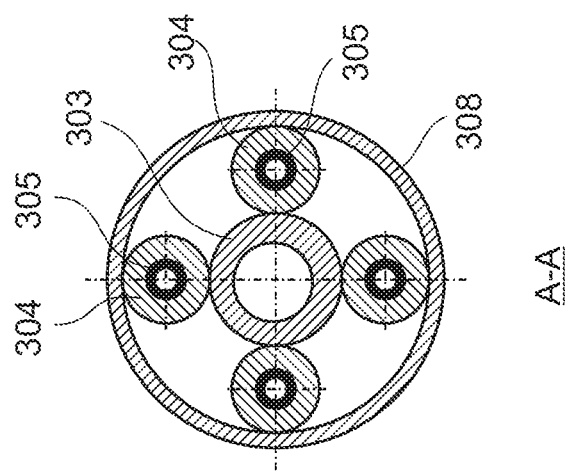
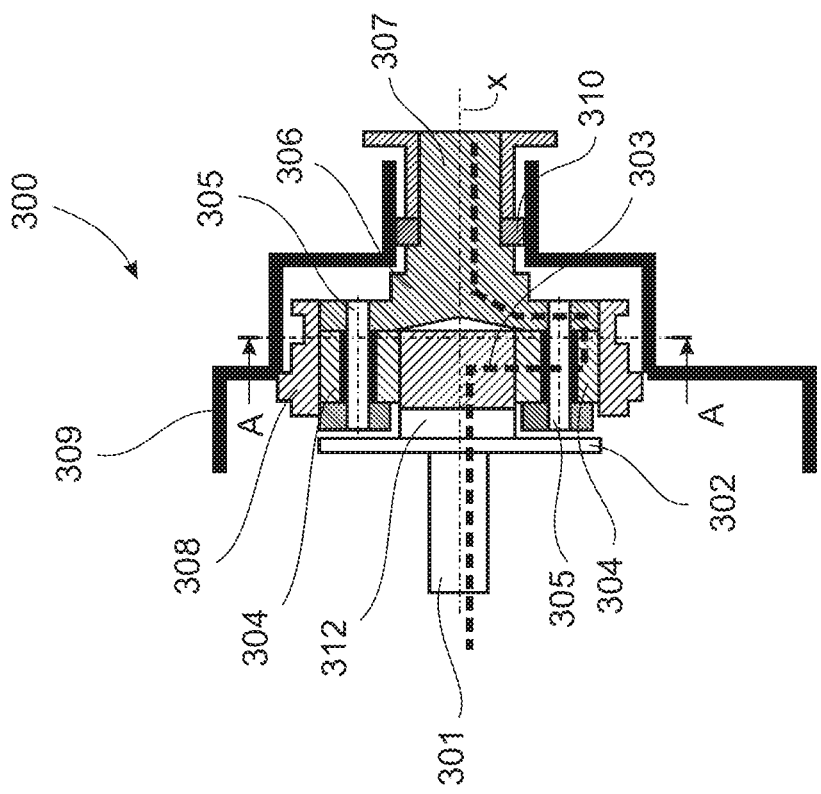
Fig.3B
Fig3A

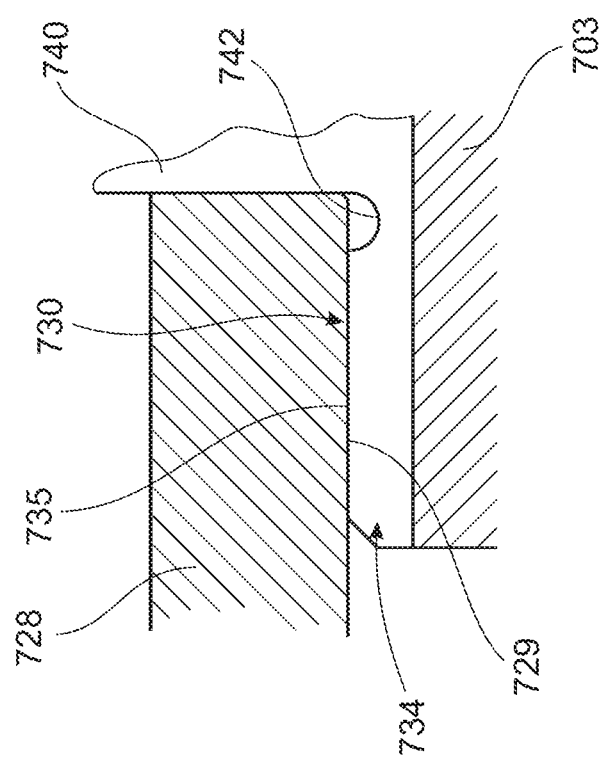

ARRANGEMENT FOR LUBRICATING A GEAR

CROSS REFERENCE TO RELATED APPLICATIONS

This application claims priority to European Patent Application No. 21185795.8, filed on 15 Jul. 2021, the disclosure and content of which is incorporated by reference herein in its entirety.

TECHNICAL FIELD

The invention relates to an arrangement for lubricating gears in transmission gearing, said arrangement including at least one conduit which is intended to deliver lubricant under pressure, and which has an outlet orifice is located adjacent the gear to be lubricated.

BACKGROUND OF THE INVENTION

It is known to lubricate the teeth of the gears of transmissions by spraying oil through nozzles which are positioned relatively close to the gear concerned. In this way, the teeth are lubricated one after the other as the teeth pass the nozzle. Transmissions subjected to heavy loads, such as a planetary gearing in a vehicle gearbox, require a relatively large quantity of lubricant. In spite of this, lubrication is often effected intermittently by means of such nozzles. Further, it is difficult to lubricate the gear teeth effectively with the aid of a lubricant spray and at the same time provide sufficient cooling of the teeth. This can be a particular problem for a sun gear in a planetary transmission.

An alternative to such lubrication systems is described in EP 1,633,990 B1. In this case, a planetary gearing comprises a component in the form of a ring gear provided with internal splines substantially matching the profile of the teeth on the sun gear. The tips of the splines are terminated before the root section between adjacent teeth on the sun gear. This allows lubricant under pressure to flow in ducts from a central supply duct in the main shaft, radially outwards to the internal splines on the ring gear and towards the meshing teeth between the sun gear and the planetary gears of the planetary gearing.

A problem with this arrangement is that the manufacturing of such components will be relatively complicated and therefore expensive and time consuming Also, the mounting of the component and the sealing of the ducts supplying lubricant will be relatively complex.

The object of the invention is to provide an improved arrangement for lubricating gears that solves the above problems relating to lubrication and cooling of gears under heavy loads, as well as providing an arrangement that is more cost effective to manufacture and easier to assemble.

SUMMARY

The above problems have been solved by an arrangement as claimed in the appended claims.

In the subsequent text, the term "vehicle" is intended to describe any type of land-based vehicle, airborne vehicles or marine vessel that can comprise a transmission provided with a lubricating arrangement according to the claims.

According to the claims, the arrangement is suitable for toothed gearings in general. The claimed arrangement is intended for use in connection with transmissions comprising toothed gearings requiring a continuous flow of lubricant to provide both lubrication and cooling to a set of meshing teeth between cooperating gears. This type of lubrication arrangement is particularly suited for a transmission under heavy loading. A typical example of such a transmission is a gearbox comprising a planetary gearing, as described in the published application WO 2011/069526 A1. The operation of a planetary gearbox is described in detail in this document, which is incorporated by reference. Examples of how the arrangement can be applied is described below with reference to such a planetary gearing. However, the application of the arrangement is not limited to planetary gearings.

According to a first aspect, the invention relates to an arrangement for lubricating a gear in a toothed gearing. The arrangement comprises,
- a shaft on which the gear is arranged,
- a component which is arranged around said shaft and comprises a surface that is facing and spaced from an end surface of the gear creating a gap for guiding and distributing lubricant to the gear,
- at least one first duct for supplying lubricant under pressure, whereby said duct has at least one opening into the gap adjacent said gear to be lubricated.

The component comprises a central, annular portion with an inner peripheral surface mounted onto an outer peripheral surface of a shoulder on the gear, where the annular portion has an inner diameter less than the pitch circle of the gear. Further, axial discontinuities are provided between the shoulder and the annular portion of the component, which discontinuities form recesses for guiding and distributing lubricant to the roots of the gear.

A non-exclusive list of toothed gearings for which the arrangement is applicable includes vehicle transmissions, in particular heavy-duty transmissions and transmissions for marine vessels, in particular vessels comprising an in-board power unit with a transmission.

Arrangements for lubricating gears in a toothed gearing are commonly connected to a supply of lubricant under pressure. A source of pressure such as a suitable pump can supply lubricant to the arrangement directly or via a pressurized tank. Lubricant can be directed to desired locations by means of individual conduits in the form of pipes or by using conduits within rotating shafts or shafts within a transmission. Such means for supplying lubricant under pressure are well known in the art and will not be described in further detail.

According to one example the toothed gearing is a planetary gearing in a vehicle transmission and the component comprising a central annular portion is an engaging ring of the planetary gearing. The annular portion of the component is preferably, but not necessarily, press-fitted onto the shoulder on the gear. The gear in this example is a sun gear in said planetary gearing.

According to a further example the shoulder has a diameter greater than the root circle of the gear. This can be achieved by machining the teeth of the sun gear at an end portion thereof until a portion of the root section between adjacent teeth remain. In this way, the axial discontinuities or recesses are formed by axial extensions of roots between each gear tooth and extend axially along the length of the peripheral surface of the shoulder. The discontinuities form recesses for guiding and distributing lubricant to the roots of the sun gear.

According to a further example the shoulder has a diameter equal to or greater than the root circle of the gear. In this example, the teeth of the sun gear at an end portion of the shoulder can be machined away partly, until a portion of the root section between adjacent teeth remains, or entirely until no portion of the teeth remain. The annular portion of the component to be fitted onto the shoulder is then provided with axial discontinuities along its inner peripheral surface. In the case where the teeth of the sun gear are machined away entirely, the axial discontinuities in the annular portion will form recesses for guiding and distributing lubricant to the roots of the gear. In the case where the teeth of the sun gear are machined so that a portion of the root section between adjacent teeth remains, then the axial discontinuities in both the shoulder and the annular portion will form combined recesses for guiding and distributing lubricant.

According to a further example the outer peripheral surface of the shoulder can comprise an undercut adjacent the teeth of the lubricated gear. The undercut is a circumferential undercut or groove that has been machined into the shoulder adjacent the teeth of the sun gear to be lubricated. The undercut provides stress relief and eliminates the risk of cracks forming at the transition between the shoulder and the teeth of the sun gear. The undercut also facilitates mounting of the annular portion of the ring gear flush against a radial surface formed by the end of the teeth of the sun gear.

According to a further example the depth of an outer portion of the axial discontinuities forming recesses for guiding and distributing lubricant to the roots of the gear increases in the direction of the component. The increase in depth is achieved by machining the outer end of each axial discontinuity, providing it with an angled surface that slopes radially inwards in the direction of the free end of the shoulder. This arrangement increases the cross-sectional surface area of the outer portion of the axial discontinuity, which causes an increase of the area at the opening the axial discontinuity where lubricant under pressure is supplied. The increased area will in turn cause an increased flow rate of the lubricant into the axial discontinuity. An effect of the increased flow rate is that the velocity of the lubricant will increase when the lubricant reaches the portion of the axial discontinuity that has not been machined.

According to a further example the width of an outer portion of the axial discontinuities forming recesses for guiding and distributing lubricant to the roots of the gear increases in the direction of the component. The increase in width is achieved by machining the outer end of each axial discontinuity, providing it with a pair of opposed angled side surfaces that diverge outwards in the direction of the free end of the shoulder. As described in the above example, this arrangement increases the cross-sectional surface area of the outer portion of the axial discontinuity, which causes an increase of the area at the opening the axial discontinuity where lubricant under pressure is supplied. The increased area will in turn cause an increased flow rate of the lubricant into the axial discontinuity. An effect of the increased flow rate is that the velocity of the lubricant will increase when the lubricant reaches the portion of the axial discontinuity that has not been machined.

According to a further example both the width and the depth of an outer portion of the axial discontinuities increase in the direction of the component. Combining the above examples will contribute to a further increase in the flow rate of the lubricant into the axial discontinuity, and an increase in the velocity of the lubricant reaching the gear teeth.

According to a second aspect the invention relates to a vehicle comprising a transmission with a lubrication arrangement as described above.

One advantage of the arrangement described above is that it requires considerably less machining of the component parts, resulting in fewer and less complex manufacturing steps for the ring component and the sun gear. The ring component can according to one example simply be provided with an annular portion that can be press-fitted onto a shoulder of the sun gear. The ring gear can be made without the need for machining splines and reducing the number of seals required for lubricating ducts. The sun gear merely needs to be machined at one end to provide a shoulder having suitable dimensions for fitting the annular portion of the ring component.

A further advantage is that the arrangement of the axial discontinuities allows them to be modified for different embodiments of a gearbox. When a type of gearbox requires an increased amount of lubricant for, e.g., the planetary gearing, then the entrance portions of the axial discontinuities in the shoulder of the sun gear can be modified to provide an enlarged cross-sectional area.

FIGURES

In the following text, the invention will be described in detail with reference to the attached drawings. These schematic drawings are used for illustration only and do not in any way limit the scope of the invention. In the drawings:

FIG. 3A shows a schematic cross-section of a planetary gear;

FIG. 3B shows a schematic a cross-section of the planetary gear FIG. 3A;

FIG. 7B shows a partial cross-section through the arrangement shown in FIG. 7A;

DETAILED DESCRIPTION

Figure 1:
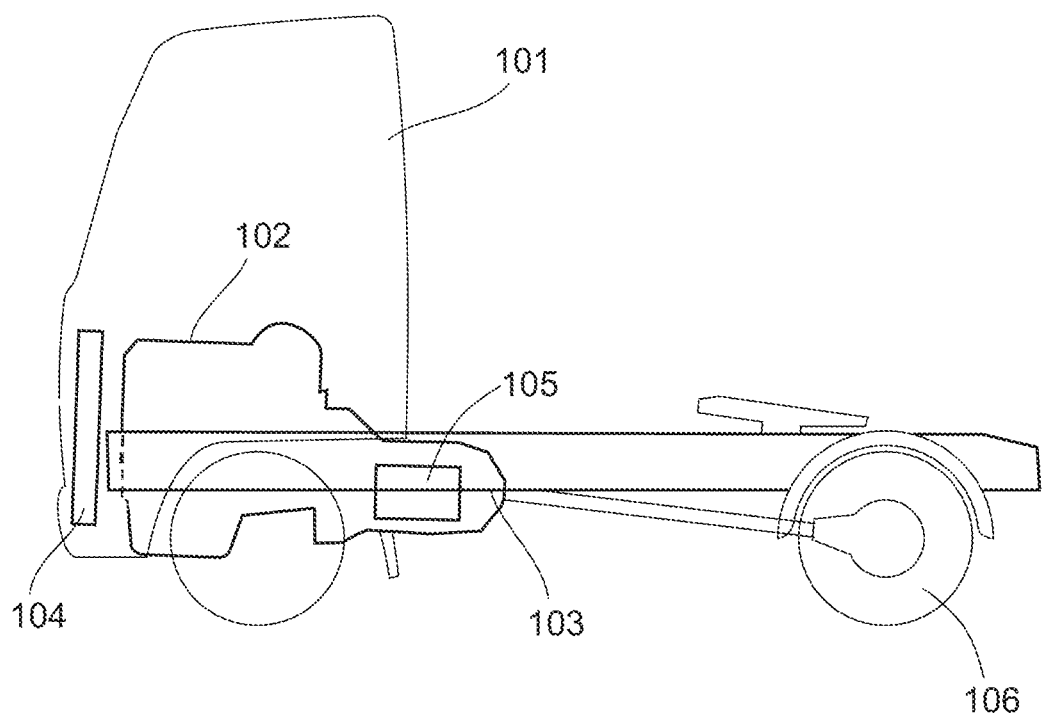
FIG. 1 shows a schematically indicated vehicle with a transmission comprising a lubrication arrangement.

FIG. 1 shows a schematically indicated vehicle 101 with a transmission comprising a lubrication arrangement according to the invention. The vehicle 101 is provided with an internal combustion engine (ICE) 102 connected to a transmission with a gearbox 103, such as an automated manual transmission (AMT), for transmitting torque to a vehicle drive shaft (not shown). The lubrication arrangement is arranged to lubricate at least one gear in a toothed gearing inside the gearbox 103. The ICE 102 is connected to a radiator arrangement 104 for cooling engine coolant and oil from the ICE 102. The gearbox 103 is controlled by the driver or automatically via an electronic control unit (ECU) 105. The ECU 105 is provided with control algorithms for controlling the transmission independently during, for instance, an engine start requested by the driver. The transmission gearbox is controlled to select a gear ratio between the engine 102 and a pair of driven wheels 106.

Figure 2:
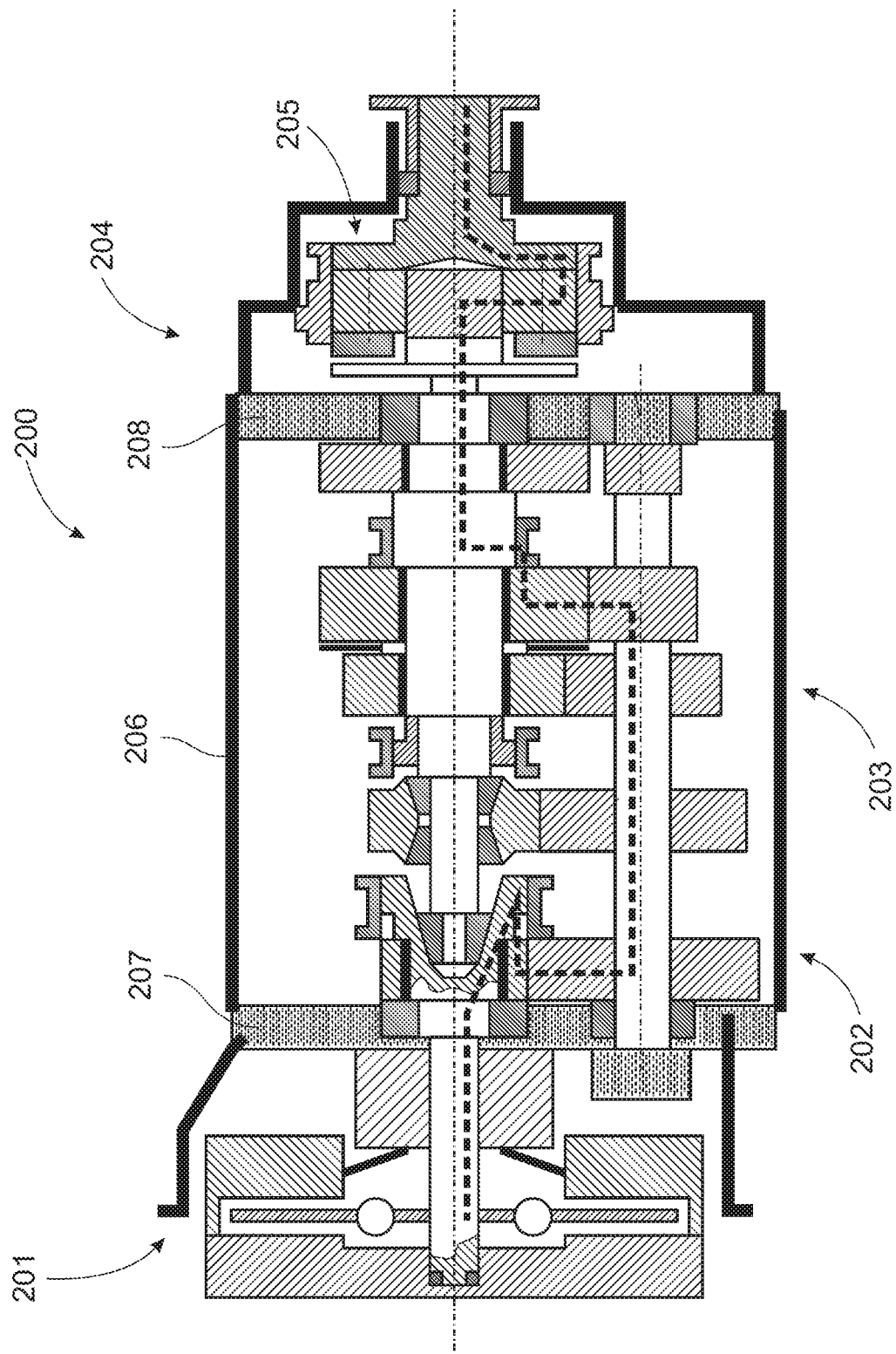
FIG. 2 shows a schematic diagram of a gearbox comprising a lubrication arrangement.

FIG. 2 shows a schematic diagram of a gearbox 200 comprising a lubrication arrangement according to the invention. The gearbox shown in FIG. 2 is a stepped compound splitter and range transmission comprising a clutch 201, a splitter section 202, a main section 203 and a range section 204 with a planetary gear 205. The operation of such a gearbox is well known in the art and will not be described in further detail here. The subsequent examples describe a lubrication arrangement arranged to lubricate at least one gear in the planetary gear 205. The gearbox 200 is enclosed by an outer gearbox casing 206 which comprises transverse walls 207, 208 providing support for the rotary shafts of the different gearbox sections.

FIG. 3A shows a schematic cross-section of a planetary gear 300 in the range section 204 of a gearbox 200 as shown in FIG. 2. The planetary gear 300 comprises an input shaft or main shaft 301, which is the output shaft from the main section 203 shown in FIG. 2. An engaging ring 302 and a sun wheel 303 are rotatably fixed to the end of the main shaft 301 by means of axial splines or similar suitable fixing means. A central portion 312 of the engaging ring 302 is directly connected to the sun wheel 303, for instance by means of press-fitting. The sun wheel 303 is a central gear that is in driving connection with planet gears 304 rotatable about individual planet gear axles 305 supported by a planet carrier 306 that can be fixed to or, as shown in FIG. 3A, part of a gearbox output shaft 307. The main shaft 301 and the gearbox output shaft 307 are arranged to rotate about a common axis X. The planetary gear 300 further comprises an outer ring gear 308 in driving connection with the planet gears 304. The outer ring gear 308 comprises teeth around its inner periphery and is displaceable in the axial direction of the planetary gear 300, in order to provide a low range mode or a high range mode of operation (see FIGS. 4A-4B). The planetary gear 300 is enclosed by a casing 309 at one end of the gearbox casing 206 shown in FIG. 2. The gearbox output shaft 307 is supported by a bearing 310 relative to the casing 309 surrounding the planetary gear 300.

FIG. 3B shows a cross-section A-A through FIG. 3A at right angles to the axis X of the main shaft 301. FIG. 3B shows the central sun wheel 303 in driving contact with four planet gears 304 which are rotatable about their respective planet gear axles 305. The figure further shows the outer ring gear 308 in driving connection with each of the four planet gears 304.

Figure 4B:
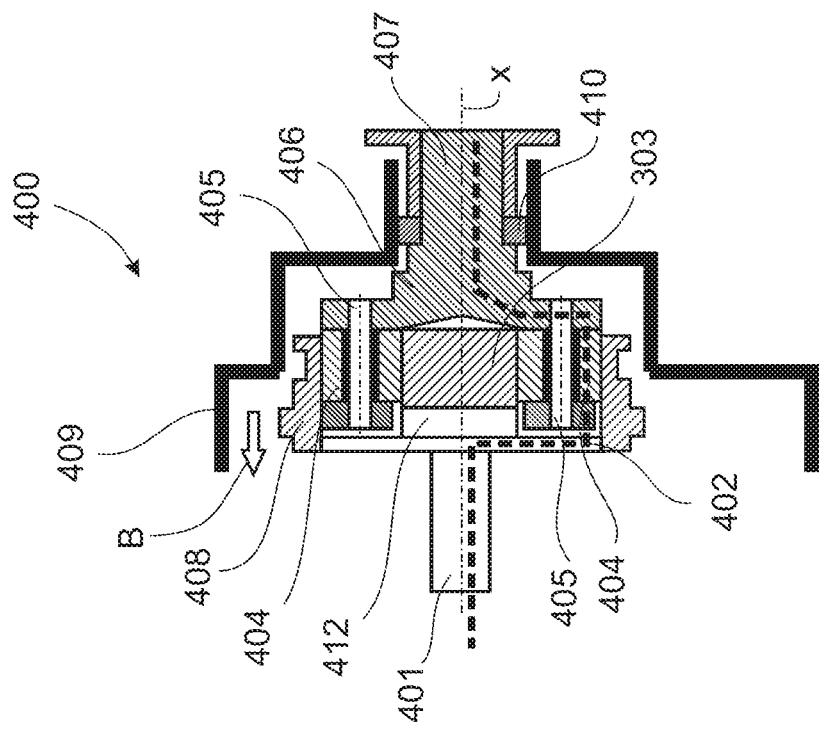
FIG. 4B shows a schematic cross-section of a planetary gear in a high range mode.
Figure 4A:
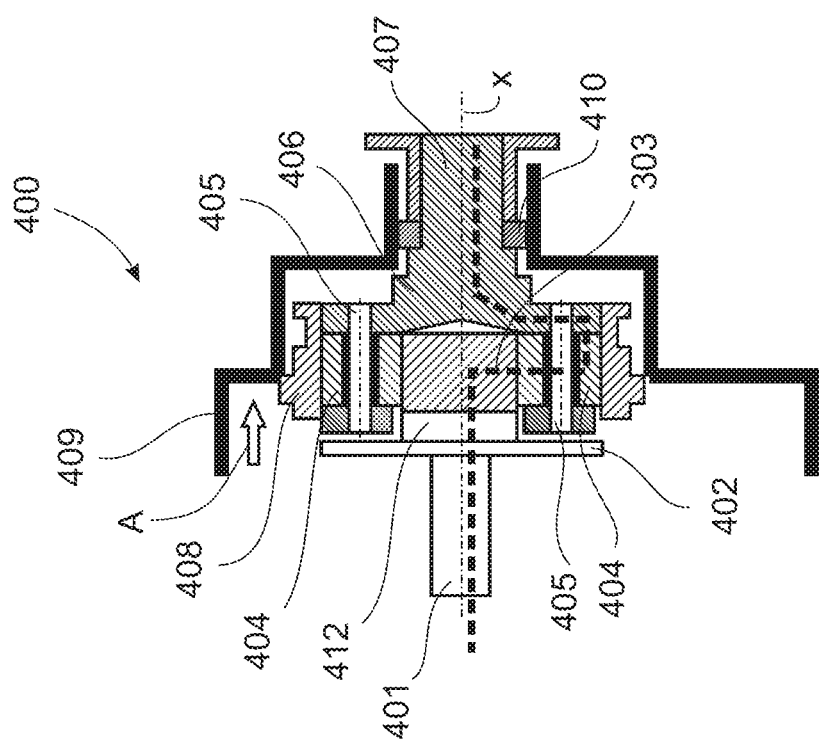
FIG. 4A shows a schematic cross-section of a planetary gear in a low range mode.

FIGS. 4A and 4B show schematic cross-sections of a planetary gear 400 of the same type as described for FIG. 3A. The planetary gear 400 comprises a main shaft 401 extending from the main section 203 shown in FIG. 2. An engaging ring 402 and a sun wheel 403 are rotatably fixed to the end of the main shaft 401. A central portion 412 of the engaging ring 402 is directly connected to the sun wheel 403, for instance by means of press-fitting. The sun wheel 403 is in driving connection with planet gears 404 rotatable about individual planet gear axles 405 supported by a planet carrier 406 that is part of a gearbox output shaft 407. The main shaft 401 and the gearbox output shaft 407 are arranged to rotate about a common axis X. The planetary gear 400 further comprises an outer ring gear 408 in driving connection with the planet gears 404. The outer ring gear 408 comprises teeth around its inner periphery and is displaceable in the axial direction of the planetary gear 400. The planetary gear 400 is enclosed by a casing 409 at one end of the gearbox casing 206 shown in FIG. 2. The gearbox output shaft 407 is supported by a bearing 410 relative to the casing 409 surrounding the planetary gear 400.

FIG. 4A shows the planetary gear 400 in a low range mode of operation. In the low range mode, the ring gear 408 is displaced into a first position as indicated by the arrow A. In the first position, the ring gear 408 is connected to the casing 409 and is fixed against rotation. Input torque from the main section of the gearbox (see FIG. 2) causes rotation of the main shaft 401 and its sun wheel 403, which will in turn rotate the planet gears 404 relative to the non-rotating ring gear 408. Subsequently, the planet gear axles 405 supporting the planet gears 404 will rotate about the sun wheel 403 and cause a rotation of the planet carrier 406 and the gearbox output shaft 407. This mode of operation causes a speed reduction from the main shaft 401 to the gearbox output shaft 407.

FIG. 4B shows the planetary gear 400 in a high range mode of operation. In the high range mode, the ring gear 408 is displaced into a second position indicated by the arrow B. In the second position, the internal teeth of the ring gear 408 are connected to a toothed outer periphery (not shown) of the engaging ring 402 and is allowed to rotate with the main shaft 401. Input torque from the main section of the gearbox (see FIG. 2) causes rotation of the main shaft 401, which will in turn rotate the engaging ring 402 and the planet gears 404. Since the planet gears 404 are prevented from rotation relative to the planet carrier 406 by the engaging ring 402 and the ring gear 408, a direct driving connection is provided between the main shaft 401, the planet carrier 406 and the gearbox output shaft 407. This mode of operation causes the main shaft 401 and the gearbox output shaft 407 to rotate at the same speed.

Figure 5A:
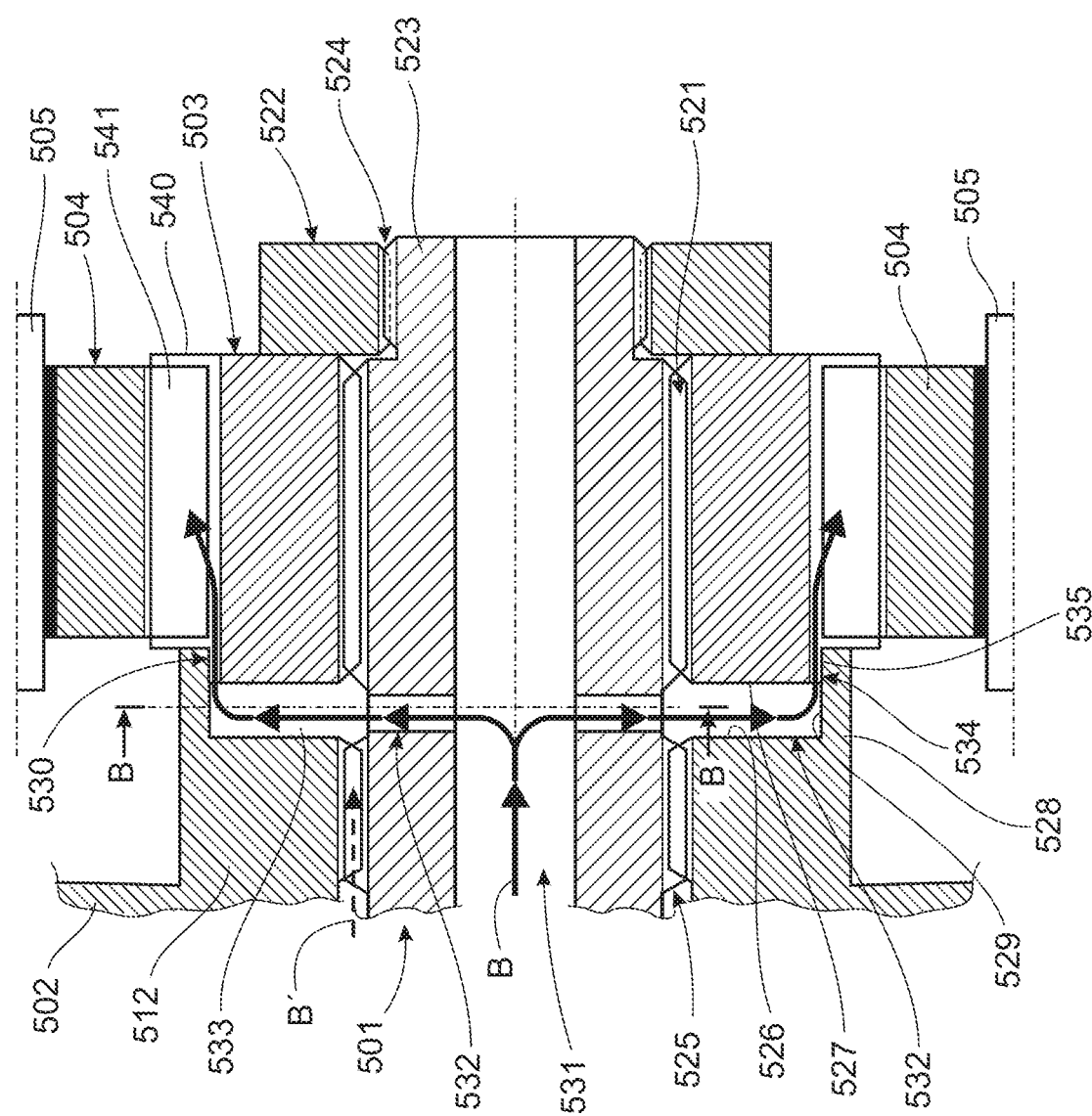
FIG. 5A shows a schematic cross-section through a first arrangement for lubricating a toothed gearing.

FIG. 5A shows a schematic cross-section through a first example of an arrangement suitable for lubricating a toothed gearing such as a sun wheel 503 and a set of cooperating planetary wheels 504 in a planetary gear of the type described above. In FIG. 5A, the planetary wheels 504 are mounted on shafts 505 supported on a planet carrier (not shown; see FIG. 3A, "306"). The arrangement in FIG. 5A comprises a main shaft 501 on which the sun wheel 503 is fixed against rotation by means of cooperating splines 521 on the main shaft 501 and the sun wheel 503, respectively. The sun wheel 503 is fixed in a predetermined axial position on the main shaft 501 by means of a retaining nut 522 mounted at a threaded end section 523 of the main shaft 501. An engaging ring 502 is arranged on the opposite side of the sun wheel 503. A central portion 512 of the engaging ring 502 is fixed against rotation by means of cooperating splines 525 on the main shaft 501 and the central portion 512, respectively. The location and function of the engaging ring 502 has been described in connection with FIG. 4A-B above. The central portion 512 of the engaging ring 502 can be located in a predetermined axial position on the main shaft 501 by a stepped section (not shown) provided on the main shaft 501. The central portion 512 is arranged around the main shaft 501 and comprises a radial surface 526 that is facing and spaced from an end surface 527 the sun gear 503. The central portion 512 further comprises an annular portion 528 with an inner peripheral surface 529. The annular portion 528 extends towards an outer peripheral surface 535 of a shoulder 530 on the sun gear 503. The annular portion 528 of the central portion 512 has an inner diameter less than the pitch circle of the sun gear 503. The annular portion 528 of the central portion 512 is fixed in position on the shoulder 530 of the sun gear 503 by press-fitting.

The main shaft 501 comprises a central duct 531 for supplying lubricant under pressure, which central duct 531 is connected to a source of lubricant for the toothed gearing. The main shaft 501 further comprises a number of radial ducts 532 each having an opening in the outer periphery of the main shaft 501 in an area located in proximity to the sun gear 503. Specifically, the radial ducts 532 open up in a gap 533 between the facing radial surfaces 526, 527 of the central portion 512 and the sun gear 503, respectively. The gap 533 is arranged for guiding and distributing lubricant from the radial ducts 532 and radially outwards to the meshing teeth 540, 541 of the sun gear 503 and the planetary gears 504. The facing surfaces 526, 527 are shown as radial surfaces in FIG. 5A for reasons of clarity. Alternative surfaces, such as concave, convex or conical facing surfaces can be used within the scope of the invention. Similarly, the radial ducts 532 extending through the main shaft 501 can be arranged at any suitable angle within the scope of the invention.

Alternatively, lubricant under pressure can be supplied from a suitable source and be supplied to the gap 533 through the splines on the main shaft 501 and the central portion 512, respectively. The flow of lubricant is indicated by a dashed arrow B'.

Figure 5B:
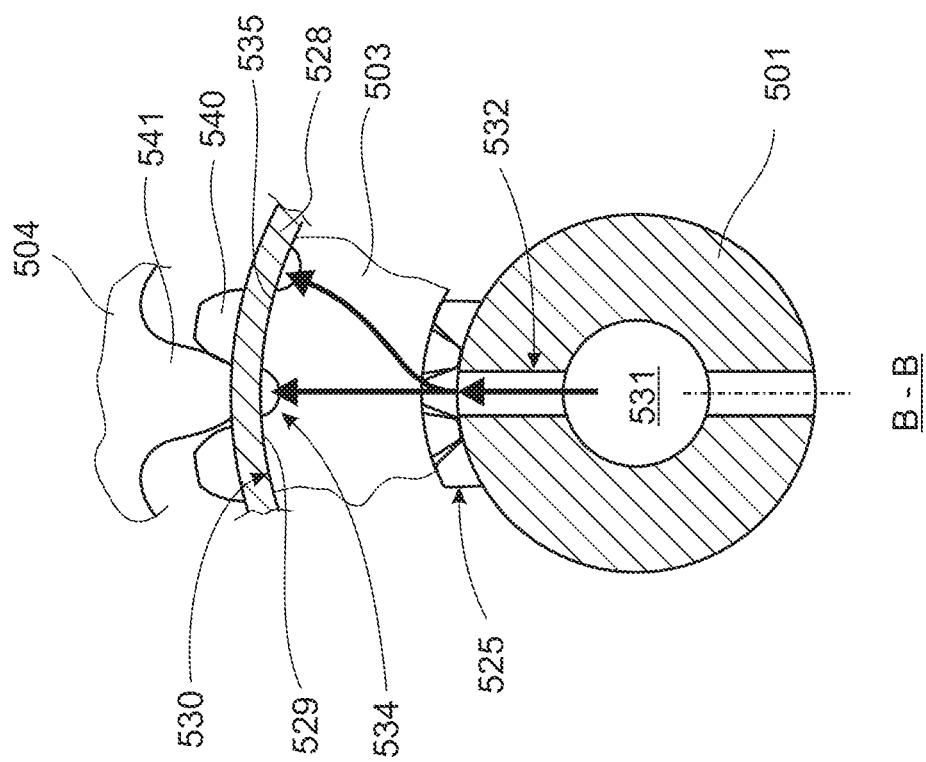
FIG. 5B shows a partial cross-section through the arrangement shown in FIG. 5A.

In order to guide lubricant from the gap 533 between the facing radial surfaces 526, 527 of the central portion 512 and the sun gear 503 and towards the meshing teeth, axial discontinuities 534 are provided between the shoulder 530 on the sun gear 503 and the annular portion 528 of the central portion 512. In the example shown in FIG. 5A, the axial discontinuities 534 are arranged along the peripheral surface of the shoulder 530, which axial discontinuities 534 form axial recesses guiding and distributing lubricant to the roots of the teeth 540 of the sun gear 503. The axial discontinuities 534 are formed by machining a section of the sun gear 503 to remove an axial section of an outer portion of the gear teeth 540 when making the shoulder 530. The sun gear 503 can be machined to a predetermined diameter, leaving a portion of the roots between teeth to provide axial discontinuities 534 with a cross-sectional area sufficient for supplying a desired flow rate of lubricant to the gear teeth. FIG. 5B shows a partial cross-section B-B through the gap 533 shown in FIG. 5A, wherein the reference numbering from FIG. 5A is retained. FIG. 5B indicates how the axial discontinuities 534 will comprise recesses in the form of axial extensions of the roots between each pair of gear teeth.

Figure 6A:
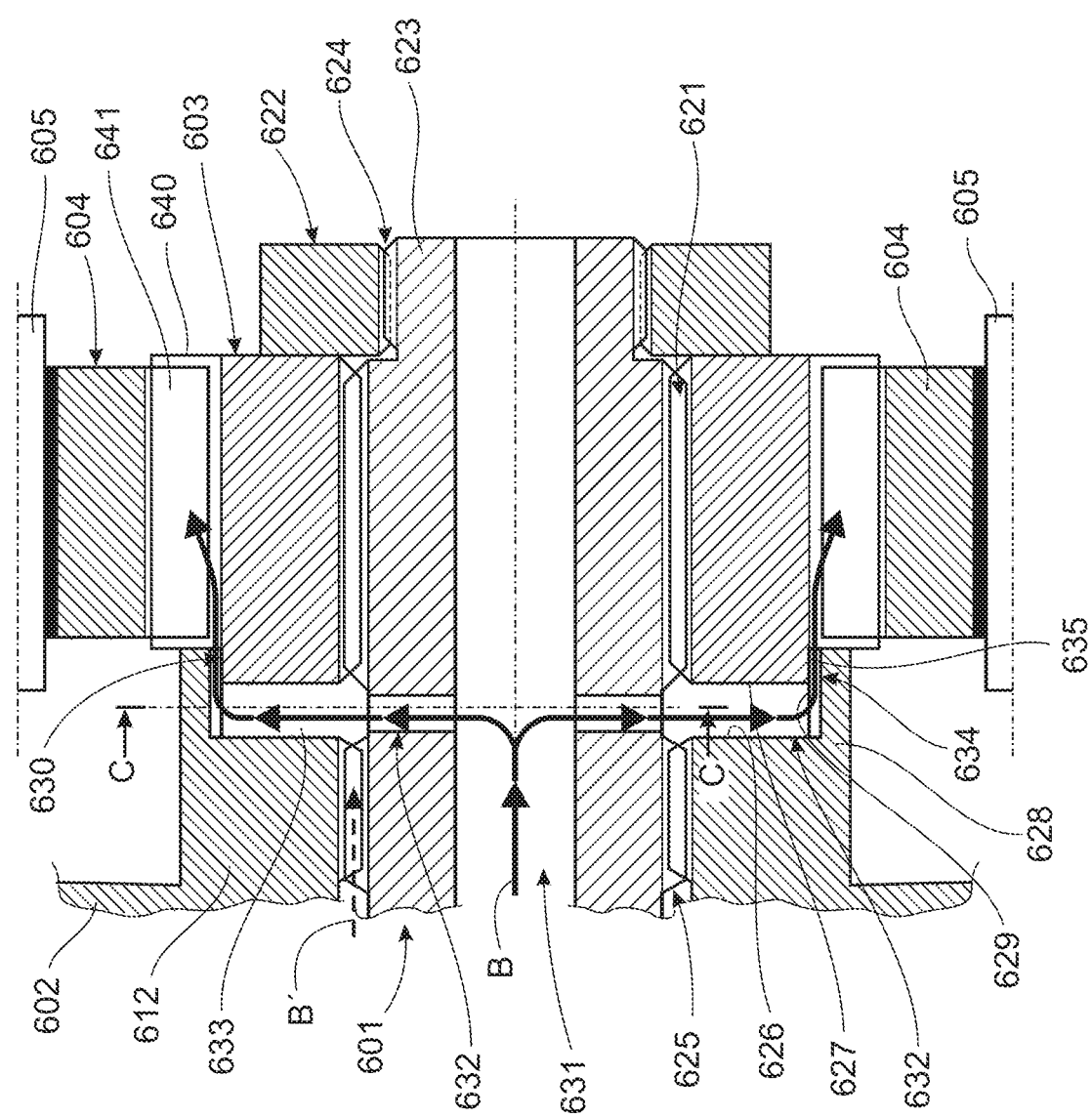
FIG. 6A shows a schematic cross-section through a second arrangement for lubricating a toothed gearing.

FIG. 6A shows a cross-section through a second example of an arrangement suitable for lubricating a toothed gearing such as a sun wheel 603 and a set of cooperating planetary wheels 604 in a planetary gear of the type described above. In FIG. 6A, the planetary wheels 604 are mounted on shafts 605 supported on a planet carrier (not shown; see FIG. 3A, "306"). The arrangement in FIG. 6A comprises a main shaft 601 on which the sun wheel 603 is fixed against rotation by means of cooperating splines 621 on the main shaft 601 and the sun wheel 603, respectively. The sun wheel 603 is fixed in a predetermined axial position on the main shaft 601 by means of a retaining nut 622 mounted at a threaded end section 623 of the main shaft 601. An engaging ring 602 is arranged on the opposite side of the sun wheel 603. A central portion 612 of the engaging ring 602 is fixed against rotation by means of cooperating splines 625 on the main shaft 601 and the central portion 612, respectively. The central portion 612 of the engaging ring 602 can be located in a predetermined axial position on the main shaft 601 by a stepped section (not shown) provided on the main shaft 601. The central portion 612 is arranged around the main shaft 601 and comprises a radial surface 626 that is facing and spaced from an end surface 627 the sun gear 603. The central portion 612 further comprises an annular portion 628 with an inner peripheral surface 629. The annular portion 628 extends towards an outer peripheral surface 635 of a shoulder 630 on the sun gear 603. The annular portion 628 of the central portion 612 has an inner diameter less than the pitch circle of the sun gear 603. The annular portion 628 of the central portion 612 is fixed in position on the shoulder 630 of the sun gear 603 by press-fitting.

The main shaft 601 comprises a central duct 631 for supplying lubricant under pressure, which central duct 631 is connected to a source of lubricant for the toothed gearing. The main shaft 601 further comprises a number of radial ducts 632 each having a radial opening in the outer periphery of the main shaft 601 in an area located in proximity to the sun gear 603. Specifically, the radial ducts 632 open up in a gap 633 between the facing radial surfaces 626, 627 of the central portion 612 and the sun gear 603, respectively. The gap 633 is arranged for guiding and distributing lubricant from the radial ducts 632 and radially outwards to the meshing teeth 640, 641 of the sun gear 603 and the planetary gears 604. The facing surfaces 626, 627 are shown as radial surfaces in FIG. 6A for reasons of clarity. Alternative surfaces, such as concave, convex or conical facing surfaces can be used within the scope of the invention. Similarly, the radial ducts 632 extending through the main shaft 601 can be arranged at any suitable angle within the scope of the invention.

Alternatively, lubricant under pressure can be supplied from a suitable source and be supplied to the gap 633 through the splines on the main shaft 601 and the central portion 612, respectively. The flow of lubricant is indicated by a dashed arrow B'.

Figure 6B:
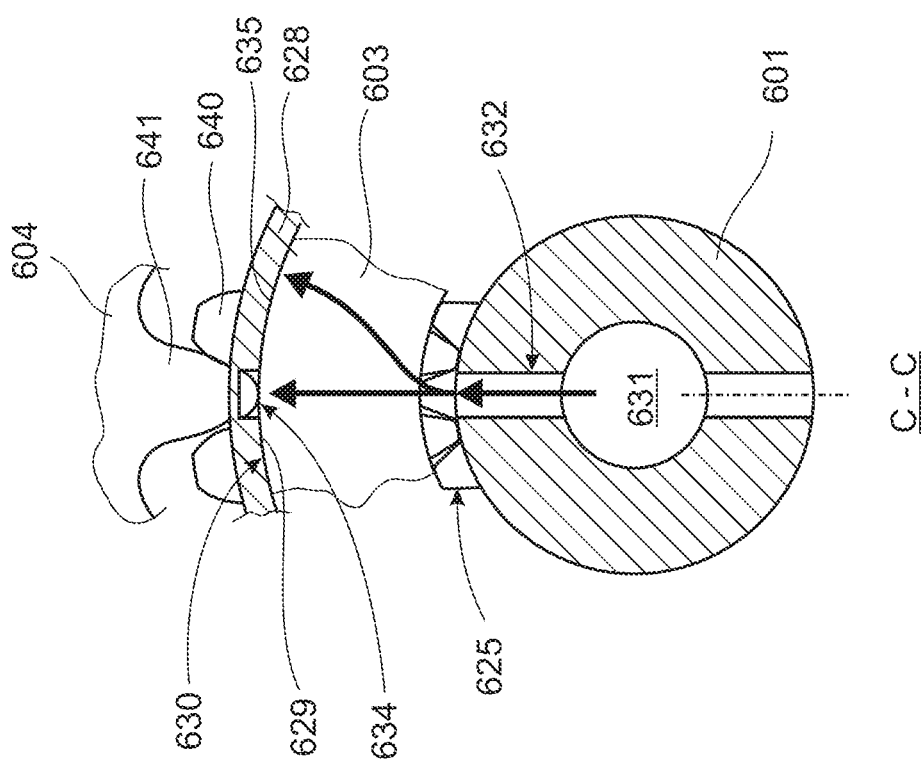
FIG. 6B shows a partial cross-section through the arrangement shown in FIG. 6A.

In order to guide lubricant from the gap 633 between the facing radial surfaces 626, 627 of the central portion 612 and the sun gear 603 and towards the meshing teeth, axial discontinuities 634 are provided between the shoulder 630 on the sun gear 603 and the annular portion 628 of the central portion 612. In the example shown in FIG. 6A, the axial discontinuities 634 are arranged along the inner peripheral surface of the annular portion 628, which axial discontinuities 634 form axial recesses guiding and distributing lubricant to the roots of the teeth 640 of the sun gear 603. The axial discontinuities 634 can be formed by machining a number of axial slots or recesses into the inner peripheral surface of the annular portion 628. The number of axial slots is preferably equal to the number of roots on the sun gear in order to achieve an even distribution of lubricant to all teeth. By selecting suitable dimensions for the radial thickness of the annular portion 628 and the width and/or depth of the axial discontinuities 634, the cross-sectional area of the axial discontinuities 634 can be varied depending on the requirement for lubrication. Also, a section of the sun gear 603 is machined to remove an axial section of an outer portion of the gear teeth 640 when making the shoulder 630. The sun gear 603 can be machined to a predetermined diameter, either removing the teeth completely or leaving a portion of the roots between teeth. The diameter of the shoulder is preferably selected to equal to the root diameter of the sun gear to ensure a flow of lubricant to the gear teeth from the axial discontinuities 634 directly into the roots between adjacent teeth. FIG. 6B shows a partial cross-section C-C through the gap 633 shown in FIG. 6A, wherein the reference numbering from FIG. 6A is retained. FIG. 6B indicates how the axial discontinuities 634 will comprise recesses in the form of axial recesses into the inner peripheral surface 629 of the annular portion 628. The axial recesses must be indexed with the roots between each pair of gear teeth 640 when assembling the central portion 612 and the sun gear 603.

Figure 7A:
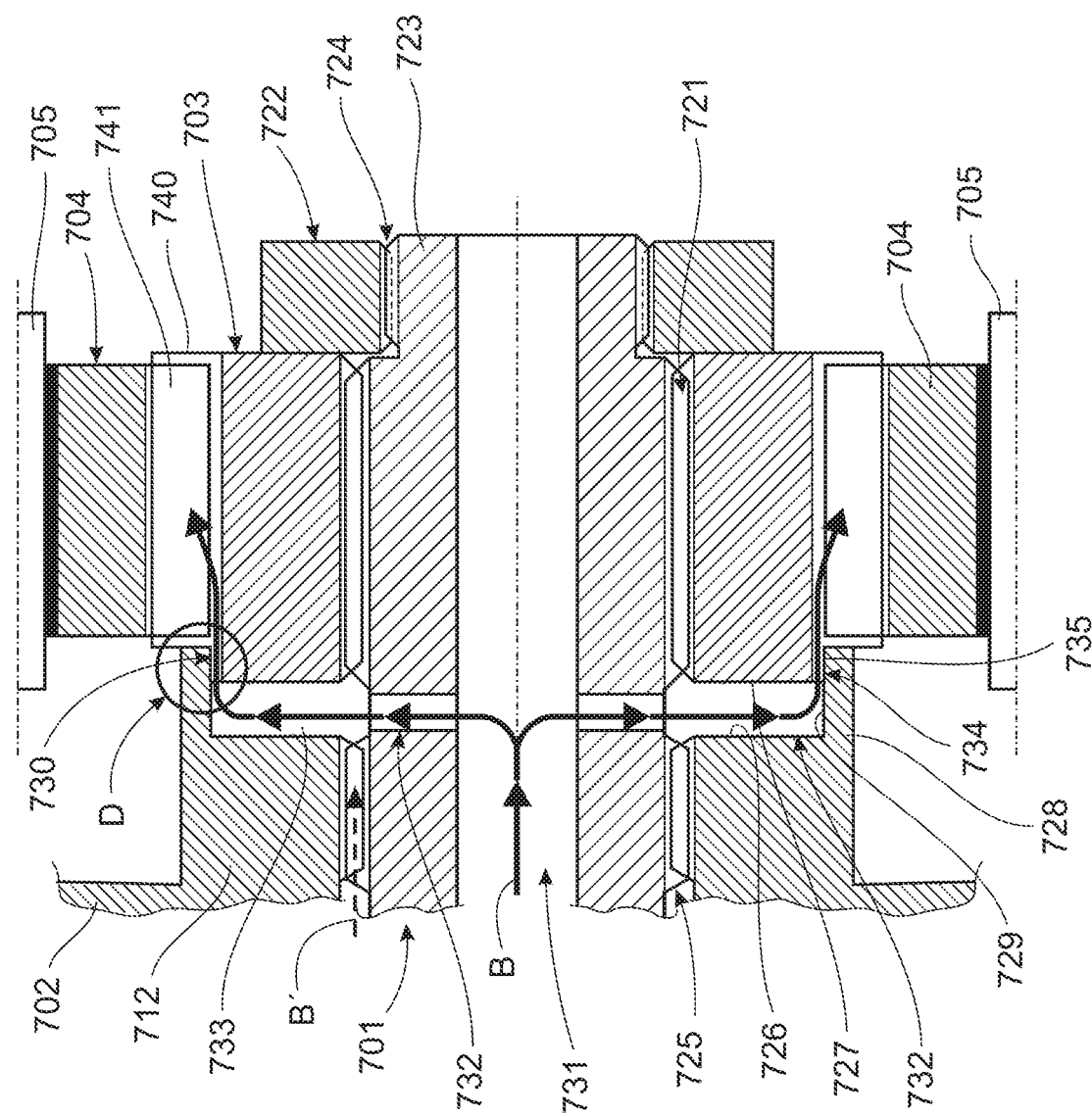
FIG. 7A shows a cross-section through a first alternative arrangement for lubricating a toothed gearing.

FIG. 7A shows a cross-section through a lubricating arrangement suitable for lubricating a toothed gearing such as a sun wheel 703 and a set of cooperating planetary wheels 704 in a planetary gear of the type described above. In FIG. 7A, the planetary wheels 704 are mounted on shafts 705 supported on a planet carrier (not shown; see FIG. 3A, "306"). The arrangement in FIG. 7A comprises a main shaft 701 on which the sun wheel 703 is fixed against rotation by means of cooperating splines 721 on the main shaft 701 and the sun wheel 703, respectively. The sun wheel 703 is fixed in a predetermined axial position on the main shaft 701 by means of a retaining nut 722 mounted at a threaded end section 723 of the main shaft 701. An engaging ring 702 is arranged on the opposite side of the sun wheel 703. A central portion 712 of the engaging ring 702 is fixed against rotation by means of cooperating splines 725 on the main shaft 701 and the central portion 712, respectively. The location and function of the engaging ring 702 has been described in connection with FIG. 4A-B above. The central portion 712 of the engaging ring 702 can be located in a predetermined axial position on the main shaft 701 by a stepped section (not shown) provided on the main shaft 701. The central portion 712 is arranged around the main shaft 701 and comprises a radial surface 726 that is facing and spaced from an end surface 727 the sun gear 703. The central portion 712 further comprises an annular portion 728 with an inner peripheral surface 729. The annular portion 728 extends towards an outer peripheral surface 735 of a shoulder 730 on the sun gear 703. The annular portion 728 of the central portion 712 has an inner diameter less than the pitch circle of the sun gear 703. The annular portion 728 of the central portion 712 is fixed in position on the shoulder 730 of the sun gear 703 by press-fitting.

The main shaft 701 comprises a central duct 731 for supplying lubricant under pressure, which central duct 731 is connected to a source of lubricant for the toothed gearing. The main shaft 701 further comprises a number of radial ducts 732 each having a radial opening in the outer periphery of the main shaft 701 in an area located in proximity to the sun gear 703. Specifically, the radial ducts 732 open up in a gap 733 between the facing radial surfaces 726, 727 of the central portion 712 and the sun gear 703, respectively. The gap 733 is arranged for guiding and distributing lubricant from the radial ducts 732 and radially outwards to the meshing teeth 740, 741 of the sun gear 703 and the planetary gears 704. The facing surfaces 726, 727 are shown as radial surfaces in FIG. 7A for reasons of clarity. Alternative surfaces, such as concave, convex or conical facing surfaces can be used within the scope of the invention. Similarly, the radial ducts 732 extending through the main shaft 701 can be arranged at any suitable angle within the scope of the invention.

Alternatively, lubricant under pressure can be supplied from a suitable source and be supplied to the gap 733 through the splines on the main shaft 701 and the central portion 712, respectively. The flow of lubricant is indicated by a dashed arrow B'.

In order to guide lubricant from the gap 733 between the facing radial surfaces 726, 727 of the central portion 712 and the sun gear 703 and towards the meshing teeth, axial discontinuities 734 are provided between the shoulder 730 on the sun gear 703 and the annular portion 728 of the central portion 712. In the example shown in FIG. 7A, the axial discontinuities 734 are arranged along the peripheral surface of the shoulder 730, which axial discontinuities 734 form axial recesses guiding and distributing lubricant to the roots of the teeth 740 of the sun gear 703. The axial discontinuities 734 are formed by machining a section of the sun gear 703 to remove an axial section of an outer portion of the gear teeth 740 when making the shoulder 730. The sun gear 703 can be machined to a predetermined diameter, leaving a portion of the roots between teeth to provide axial discontinuities 734 with a cross-sectional area sufficient for supplying a desired flow rate of lubricant to the gear teeth.

FIG. 7B shows an enlarged view of the circled area D shown in FIG. 7A, wherein the reference numbering from FIG. 7A is retained. FIG. 7B shows the outer peripheral surface 735 of the shoulder 730 on the sun gear 703 in contact with the inner peripheral surface 729 of the annular portion 728 extending from the central portion 712. FIG. 7B shows a circumferential undercut 742 that has been machined into the shoulder 730 adjacent the teeth of the sun gear 740 to be lubricated. The undercut 742 provides stress relief and eliminates the risk of cracks forming at the transition between the shoulder and the teeth of the sun gear. The undercut 742 also facilitates mounting of the annular portion 728 flush against a radial surface formed by the end of the teeth 740 of the sun gear 703.

FIGS. 7A and 7B illustrate axial discontinuities in a shoulder of the type described in connection with the example in FIGS. 5A and 5B. However, the undercut shown in FIG. 7B can also be used in a shoulder according to the example shown in FIGS. 6A and 6B.

Figure 8A:
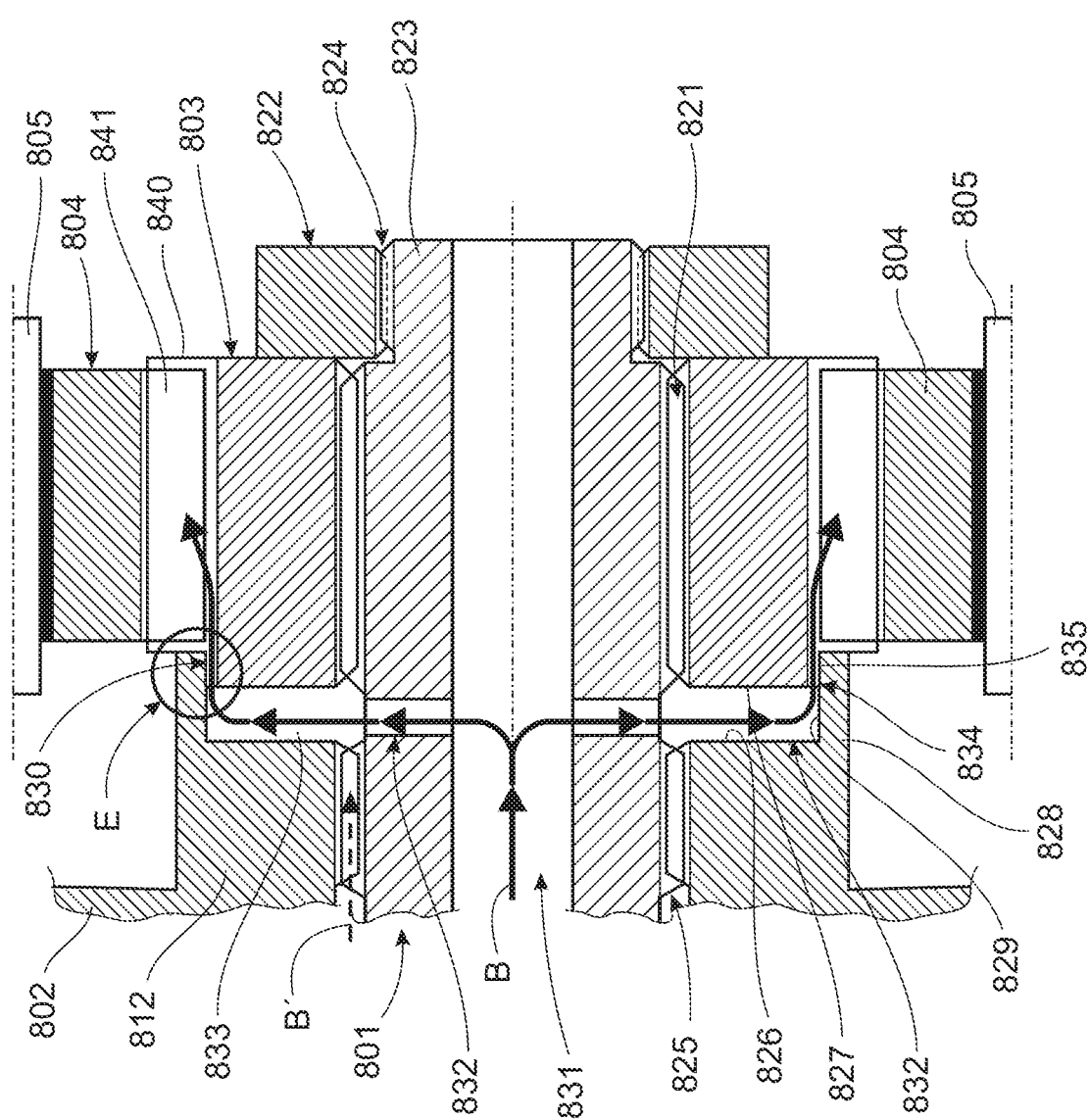
FIG. 8A shows a cross-section through a second alternative arrangement for lubricating a toothed gearing.

FIG. 8A shows a cross-section through a lubricating arrangement suitable for lubricating a toothed gearing such as a sun wheel 803 and a set of cooperating planetary wheels 804 in a planetary gear of the type described above. In FIG. 8A, the planetary wheels 804 are mounted on shafts 805 supported on a planet carrier (not shown; see FIG. 3A, "306"). The arrangement in FIG. 8A comprises a main shaft 801 on which the sun wheel 803 is fixed against rotation by means of cooperating splines 821 on the main shaft 801 and the sun wheel 803, respectively. The sun wheel 803 is fixed in a predetermined axial position on the main shaft 801 by means of a retaining nut 822 mounted at a threaded end section 823 of the main shaft 801. An engaging ring 802 is arranged on the opposite side of the sun wheel 803. A central portion 812 of the engaging ring 802 is fixed against rotation by means of cooperating splines 825 on the main shaft 801 and the central portion 812, respectively. The location and function of the engaging ring 802 has been described in connection with FIG. 4A-B above. The central portion 812 of the engaging ring 802 can be located in a predetermined axial position on the main shaft 801 by a stepped section (not shown) provided on the main shaft 801. The central portion 812 is arranged around the main shaft 801 and comprises a radial surface 826 that is facing and spaced from an end surface 827 the sun gear 803. The central portion 812 further comprises an annular portion 828 with an inner peripheral surface 829. The annular portion 828 extends towards an outer peripheral surface 835 of a shoulder 830 on the sun gear 803. The annular portion 828 of the central portion 812 has an inner diameter less than the pitch circle of the sun gear 803. The annular portion 828 of the central portion 812 is fixed in position on the shoulder 830 of the sun gear 803 by press-fitting.

The main shaft 801 comprises a central duct 831 for supplying lubricant under pressure, which central duct 831 is connected to a source of lubricant for the toothed gearing. The main shaft 801 further comprises a number of radial ducts 832 each having a radial opening in the outer periphery of the main shaft 801 in an area located in proximity to the sun gear 803. Specifically, the radial ducts 832 open up in a gap 833 between the facing radial surfaces 826, 827 of the central portion 812 and the sun gear 803, respectively. The gap 833 is arranged for guiding and distributing lubricant from the radial ducts 832 and radially outwards to the meshing teeth 840, 841 of the sun gear 803 and the planetary gears 804. The facing surfaces 826, 827 are shown as radial surfaces in FIG. 8A for reasons of clarity. Alternative surfaces, such as concave, convex or conical facing surfaces can be used within the scope of the invention. Similarly, the radial ducts 832 extending through the main shaft 801 can be arranged at any suitable angle within the scope of the invention.

Alternatively, lubricant under pressure can be supplied from a suitable source and be supplied to the gap 833 through the splines on the main shaft 801 and the central portion 812, respectively. The flow of lubricant is indicated by a dashed arrow B'.

In order to guide lubricant from the gap 833 between the facing radial surfaces 826, 827 of the central portion 812 and the sun gear 803 and towards the meshing teeth, axial discontinuities 834 are provided between the shoulder 830 on the sun gear 803 and the annular portion 828 of the central portion 812. In the example shown in FIG. 8A, the axial discontinuities 834 are arranged along the peripheral surface of the shoulder 830, which axial discontinuities 834 form axial recesses guiding and distributing lubricant to the roots of the teeth 840 of the sun gear 803. The axial discontinuities 834 are formed by machining a section of the sun gear 803 to remove an axial section of an outer portion of the gear teeth 840 when making the shoulder 830. The sun gear 803 can be machined to a predetermined diameter, leaving a portion of the roots between teeth to provide axial discontinuities 834 with a cross-sectional area sufficient for supplying a desired flow rate of lubricant to the gear teeth.

Figure 8C:
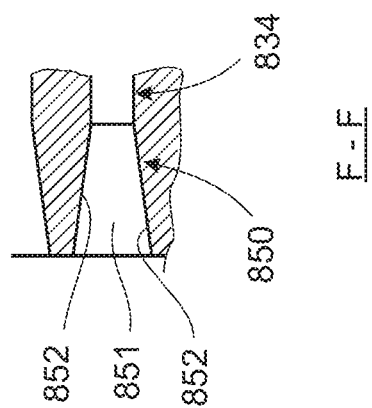
FIG. 8C shows a partial cross-section through the arrangement shown in FIG. 8B.
Figure 8B:
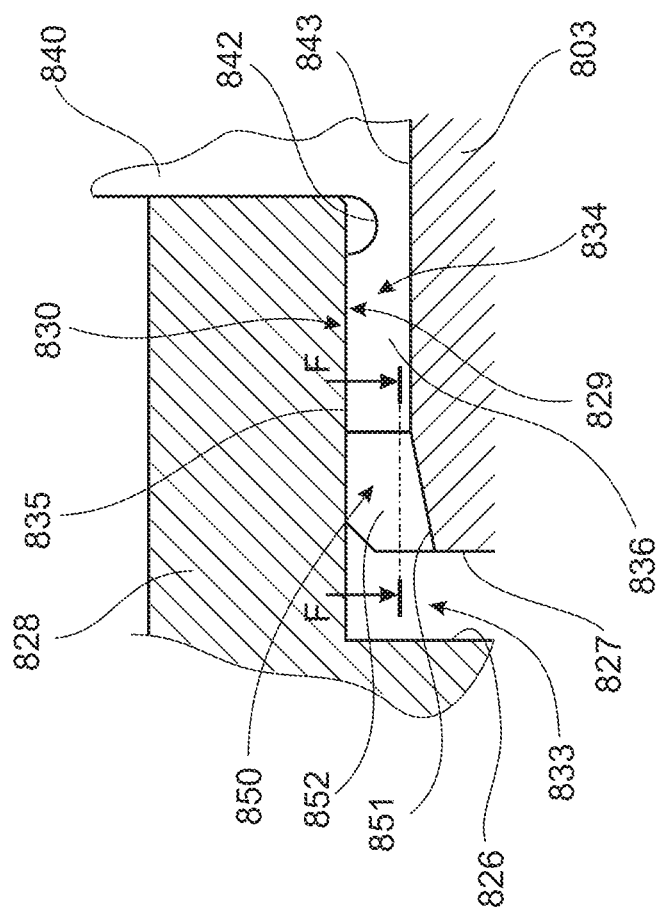
FIG. 8B shows a partial cross-section through the arrangement shown in FIG. 8A.

FIG. 8B shows an enlarged view of the circled area E shown in FIG. 8A, wherein the reference numbering from FIG. 8A is retained. FIG. 8B shows the outer peripheral surface 835 of the shoulder 830 on the sun gear 803 in contact with the inner peripheral surface 829 of the annular portion 828 extending from the central portion 812. FIG. 8B shows one of the axial discontinuities 834 forming a recess for guiding and distributing lubricant to one of the roots 843 between two adjacent teeth 840 of the sun gear 803. The axial discontinuities 834 in this example form an extension of the root 843 between adjacent teeth into the outer peripheral surface 835 of the shoulder 830.

FIG. 8B shows that the depth of an outer portion 850 of the axial discontinuity 834 adjacent the free end of the shoulder 830 increases in the direction of the central portion 812. The increase in depth is achieved by machining the outer end of each axial discontinuity, providing it with an angled surface 851 that slopes radially inwards in the direction of the gap 833 between the facing radial surfaces 826, 827 of the central portion 812 and the sun gear 803. This arrangement increases the cross-sectional surface area of the outer portion 850 of the axial discontinuity 834, which causes an increase of the area at the opening the axial discontinuity 834. The increased area will in turn cause an increased flow rate of the lubricant into the axial discontinuity 834.

FIG. 8C shows a partial cross-section F-F through the diverging portion of the lubricant duct in FIG. 8B. FIG. 8C shows that the width of an outer portion 850 of the axial discontinuity 834 adjacent the free end of the shoulder 830 increases in the direction of the central portion 812. The increase in width is achieved by machining the outer end of each axial discontinuity, providing it with a pair of opposed angled surfaces 852 that diverge outwards in the direction of the gap 833 between the facing radial surfaces 826, 827 of the central portion 812 and the sun gear 803. This arrangement further increases the cross-sectional surface area of the outer portion 850 of the axial discontinuity 834, which causes an additional increase of the area at the opening the axial discontinuity 834. The increased area will in turn cause an increased flow rate of the lubricant into the axial discontinuity 834.

The example illustrated in FIGS. 8B and 8C shows an axial discontinuity 834 with an outer portion 850 that increases both in depth and in width. Depending on the required flow rate of lubricant into the axial discontinuity 834 it is of course also possible to enlarge the cross-sectional area of the outer portion 850 by increasing either one of the width or the depth separately.

FIGS. 8A-8C illustrate axial discontinuities in a shoulder of the type described in connection with the example in FIGS. 5A and 5B. However, the enlargement of the outer portion of the axial discontinuities 834 as shown in FIGS. 8B and 8C can also be used in a shoulder according to the example shown in FIGS. 6A and 6B, specifically for examples where the shoulder has been machined to leave a portion of the roots in the outer surface thereof.

The invention should not be deemed to be limited to the embodiments described above, but rather a number of further variants and modifications are conceivable within the scope of the following patent claims. For example, the above examples are directed to lubrication of mating teeth of a sun gear and a set of planetary gears. However, the invention is also applicable to cooperating gears in general where a first gear is mounted on a shaft with a central duct for lubrication. An additional component comprising a central body with an annular projection can be mounted onto a shoulder on the first gear in the same way as described above in order to provide lubrication directly to the roots of the first gear. Hence, the invention is not limited to planetary gears.

The invention claimed is:

1. An arrangement for lubricating a gear in a toothed gearing comprising:
   a shaft on which the gear is arranged;
   a component arranged around said shaft and comprising a surface that is facing and spaced from an end surface of the gear creating a gap for guiding and distributing lubricant to the gear;
   at least one first duct for supplying lubricant under pressure, whereby said duct has at least one opening into the gap adjacent said gear to be lubricated;
   wherein the component comprises an annular portion with a radially inner surface mounted onto a radially outer surface of a shoulder on the gear, where the annular portion has an inner diameter less than the pitch circle of the gear; and
   wherein axial discontinuities are provided between the shoulder and the annular portion of the component, which discontinuities form recesses for guiding and distributing lubricant to the roots of the gear.

2. The arrangement according to claim 1, wherein the component comprises an engaging ring in a planetary gearing.

3. The arrangement according to claim 1, wherein the annular central portion of the component is press-fitted onto the shoulder on the gear.

4. The arrangement according to claim 1, wherein the gear comprises a sun gear in a planetary gearing.

5. The arrangement according to claim 1, wherein the shoulder has a diameter greater than the root circle of the gear.

6. The arrangement according to claim 1, wherein the axial discontinuities are axial extensions of roots between each gear tooth of the gear.

7. The arrangement according to claim 1, wherein the shoulder has axial discontinuities along a peripheral surface, which axial discontinuities form recesses for guiding and distributing lubricant to the roots of the gear.

8. The arrangement according to claim 1, wherein the annular portion of the component has axial discontinuities along its radially inner surface for guiding and distributing lubricant to the roots of the gear.

9. The arrangement according to claim 1, wherein the radially outer surface of the shoulder comprises an undercut adjacent the teeth of the lubricated gear.

10. The arrangement according to claim 1, wherein the width of an outer portion of the axial discontinuities forming recesses for guiding and distributing lubricant to the roots of the gear increases in the direction of the component.

11. The arrangement according to claim 1, wherein the depth of an outer portion of the axial discontinuities forming recesses for guiding and distributing lubricant to the roots of the gear increases in the direction of the component.

12. A vehicle comprising a transmission with a lubrication arrangement according to claim 1.

\* \* \* \* \*